(12) United States Patent
Naffziger

(10) Patent No.: US 6,789,167 B2
(45) Date of Patent: Sep. 7, 2004

(54) METHOD AND APPARATUS FOR MULTI-CORE PROCESSOR INTEGRATED CIRCUIT HAVING FUNCTIONAL ELEMENTS CONFIGURABLE AS CORE ELEMENTS AND AS SYSTEM DEVICE ELEMENTS

(75) Inventor: Samuel Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 10/092,668

(22) Filed: Mar. 6, 2002

(65) Prior Publication Data
US 2003/0172232 A1 Sep. 11, 2003

(51) Int. Cl.[7] ............................................... G06F 12/00
(52) U.S. Cl. ...................... 711/118; 711/156; 711/142; 711/118
(58) Field of Search ................................ 711/118, 156, 711/142

(56) References Cited

U.S. PATENT DOCUMENTS

| | | | | |
|---|---|---|---|---|
| 6,070,200 A | * | 5/2000 | Gates et al. | 710/20 |
| 6,334,173 B1 | * | 12/2001 | Won et al. | 711/156 |
| 2003/0046492 A1 | * | 3/2003 | Gschwind et al. | 711/118 |
| 2003/0191876 A1 | * | 10/2003 | Fallon | 710/68 |

* cited by examiner

Primary Examiner—Mano Padmanabhan
Assistant Examiner—Mehdi Namazi

(57) ABSTRACT

A multiple-processor integrated circuit has convertible cache modules capable of operating in a local memory mode and a cache mode associated with at least one of its multiple processors. The integrated circuit also has at least one peripheral-specific apparatus for interfacing at least one of its processors to common peripheral devices. At least one processor is capable of operating as a general purpose processor when the convertible cache is operated in the cache mode, and as a processor of an intelligent peripheral when the convertible cache is operated in the local memory mode.

5 Claims, 5 Drawing Sheets

METHOD AND APPARATUS FOR MULTI-CORE PROCESSOR INTEGRATED CIRCUIT HAVING FUNCTIONAL ELEMENTS CONFIGURABLE AS CORE ELEMENTS AND AS SYSTEM DEVICE ELEMENTS

FIELD OF THE INVENTION

The invention relates to the architecture and design of high-performance multithreaded processor and multiprocessor integrated circuits.

BACKGROUND FO THE INVENTION

Most modern processors embody several pipelined functional units. Typical such units include integer units capable of performing integer arithmetic between register operands, and floating point units capable of performing floating point arithmetic between register operands. There may be dedicated functional units for performing address arithmetic, or, in some machines, integer units may perform these operations. Other functional units may include fetch and store units that operate to retrieve operands from, or store results into, memory. These functional units are referred to herein as resources.

Many modern processors are capable of commanding operations in more than one functional unit simultaneously. Processors having this ability include many VLIW (Very Long Instruction Word) processors and the Itanium (Trademark of Intel Corporation) processors. The process of commanding operations in functional units is instruction decode and dispatch.

The Itanium processors use an explicitly parallel instruction set wherein instructions are packaged in groups of three, where instructions are not permitted to depend on results of instructions of the same group, and where it is often possible to dispatch multiple instructions of the same group simultaneously. The Itanium processors, and other superscalar machines, have sufficient resources, and sufficiently complex control, that it is possible to simultaneously dispatch operations from more than one instruction simultaneously Much modern software is written to take advantage of multiple processor machines. This software typically is written to use multiple threads. Software is also frequently able to prioritize those threads, determining which thread should receive the most resources at a particular time.

Multithreaded processors are those that have more than one instruction pointer, typically have more than one register set, and are capable of executing more than one instruction stream. For example, machines are known wherein a single pipelined execution unit is timeshared among several instruction streams. These machines appear to software as multiple, independent, processors.

Machines of superscalar performance having multiple processors on single integrated circuits are known. Machines of this type include some implementations of the Itanium, IBM Power-4 and PA 8800. Typically, each processor on these integrated circuits has its own set of execution unit pipelines. Their performance and die area, and therefore cost for execution units, is therefore typically much greater than with a timeshared multithreaded machine.

Many modern machines integrate some system devices onto their processor integrated circuits. These system devices may include memory interface controllers, cache memory subsystems, Direct Memory Access (DMA) controllers, disk interfaces, display adapters, and other Input/Output (I/O) controllers.

The system devices desired on a processor integrated circuit vary with the system in which the integrated circuit is installed. For example, an on-chip display adapter may be of great use in low cost systems, while an external high-performance display adapter may be provided in a higher performance system. Similarly, a low cost system may require a single port of IDE disk interface, while a higher-end system may require dual SCSI disk-interface ports.

The lengthy design cycle and high expense of developing high performance processor integrated circuits renders it impractical to design and market a large variety of processor integrated circuit designs each having system devices tailored to a particular set of applications.

Typically, system devices are constructed of custom hardware that is typically not interchangeable with processor hardware on the integrated circuit. Further, each system device is typically a custom design that is useful for only a particular function. Unused system devices present on an integrated circuit consume device area, thereby increasing device cost. Unused devices may also consume power.

Nature of the Problem

It is generally desirable to simplify systems, and reducing system cost, by increasing integration of system functions on a single VLSI device. It is therefore desirable to minimize the integrated circuit area allocated to particular system devices, while providing the flexibility of having a wide variety of system device types on a processor integrated circuit.

SUMMARY OF THE INVENTION

A multiple processor integrated circuit embodies a pool of resources that may be utilized as either components of system devices or components of processor cores. The circuit also has a group of specialty functional blocks of particular utility in constructing particular system devices. The circuit is provided with an allocation control mechanism whereby these resources may be dynamically assigned to groups.

The integrated circuit also has an allocation control mechanism. The allocation control mechanism is capable of configuring each of these resource groups to function as a system device or as a processor core.

In various embodiments, the system devices that may be constructed from resource groups (hereinafter constructable devices) include at least one disk interface adapter capable of interfacing with external disk drives of the IDE, SCSI, or Fibre Channel types. The constructable devices can also be configured as a network adapter capable of interfacing with interconnect of the 100 baseT or Gigabit type, or as a display adapter.

DETAILED DESCRIPTION OF THE EMBODIMENTS

Figure 1:
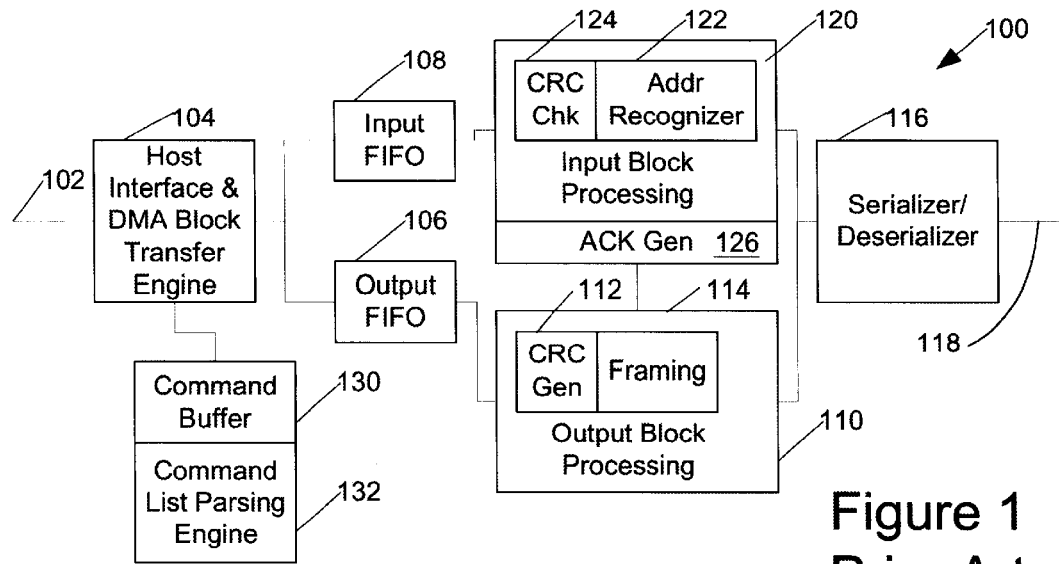
FIG. 1 is a block diagram of a network adapter as known in the art.

A network adapter 100 (FIG. 1) as known in the art has a connection 102 to a host computer system (not shown), and a host interface and DMA block transfer engine 104. Host interface and DMA block transfer engine 104 fetches data from a memory of the host computer system into an output FIFO 106, and stores data from an input FIFO 108 into the memory of the host computer system. Data from output FIFO 106 is prepared for transmission by output block processing logic 110, where error detection codes such as cyclic redundancy check (CRC) are generated 112 and the data is framed 114 into packets. Packets are transmitted by serializer/deserializer 116, and output over local interconnect 118 to a physical layer interface (not shown). Received data is received from the physical layer interface (not shown) over local interconnect 118 into serializer/deserializer 116, and then into input block processing logic 120. Input blcok processing logic 120 includes an address recognizer 122 for recognizing received packets addressed to the network adapter 100, and CRC checker 124. An ACK Generator 126 generates any acknowledgment packets required by a network protocol used by the network adapter 100, and feeds them into the output block processing logic 110 for transmission. Received data is then placed in input FIFO 108 for transmission into the memory of the host computer system. The network adapter 100 also typically has a command buffer 130 and a command parsing engine 132 for decoding and executing commands from the host computer system; these commands may include lists of data blocks to be sent and lists of destination addresses in memory for received packets.

Figure 2:
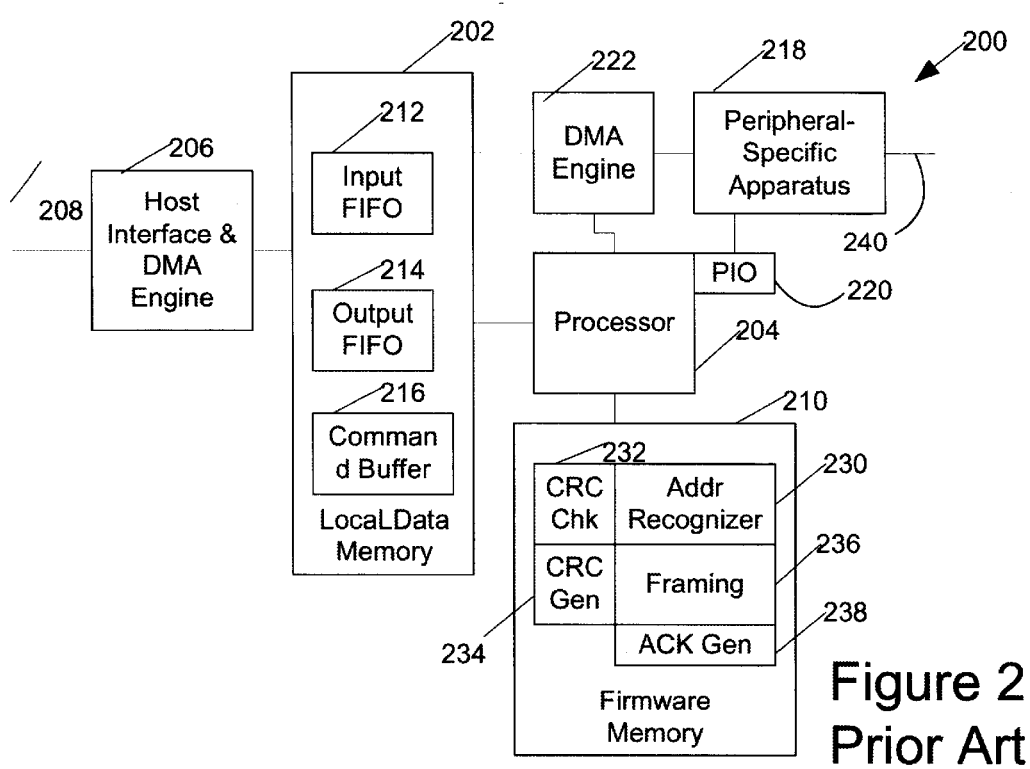
FIG. 2, a block diagram of a processor as known in the art.

It is known that many peripherals, including network adapters, disk interfaces, and RAID controllers, may be implemented as an intelligent peripheral 200 (FIG. 2). Typically, an intelligent peripheral has a local memory 202 accessible to a local processor 204. A host interface and DMA transfer engine 206 is often provided for reading and writing data over a connection 208 between local memory 202 and a host computer system. Local processor 204 executes instructions from a firmware memory 210. Input FIFO 212, output FIFO 214, command buffer 216 are implemented as data structures in local memory 202. A small peripheral-specific apparatus 218 couples through either or both a programmed I/O (PIO) 220 path to the processor or a DMA engine 222 to local memory 202.

In an intelligent peripheral, firmware memory 210 contains instructions for operating the peripheral. These instructions may include instructions enabling the processor to perform address recognition 230, CRC checking 232, CRC generation 234, packet framing 236, and ACK generation 238 as necessary for the type of the intelligent peripheral 200. The firmware memory 210 contents are typically customized to the type of intelligent peripheral 200. Peripheral-specific apparatus 218 may be a serializer-deserializer unit if the intelligent peripheral 200 is a network adapter. Alternatively, peripheral-specific apparatus 218 may include apparatus for interfacing to a local interconnect 240 for coupling to a disk drive (not shown) if the intelligent peripheral 200 is a disk controller or RAID controller.

The present multiple processor integrated circuit 300 (FIG. 3) has at least two processor cores 302. At least one of the processor cores 302 is associated with a first level convertible instruction cache 304 and a first level convertible data cache 306. There is also a second level cache 308 and a memory bus interface 310 for connection to higher level cache and/or main memory.

The integrated circuit 300 also has several sets of peripheral-specific apparatus (PSA), which in a particular embodiment include a network interface PSA 312, a disk interface PSA 314, and a display adapter PSA 316. These PSA's 312, 314, and 316 are addressable from each core processor. The PSA's 312, 314, and 316, communicates to circuitry outside the integrated circuit through reconfigurable I/O pins 318.

Figure 4:
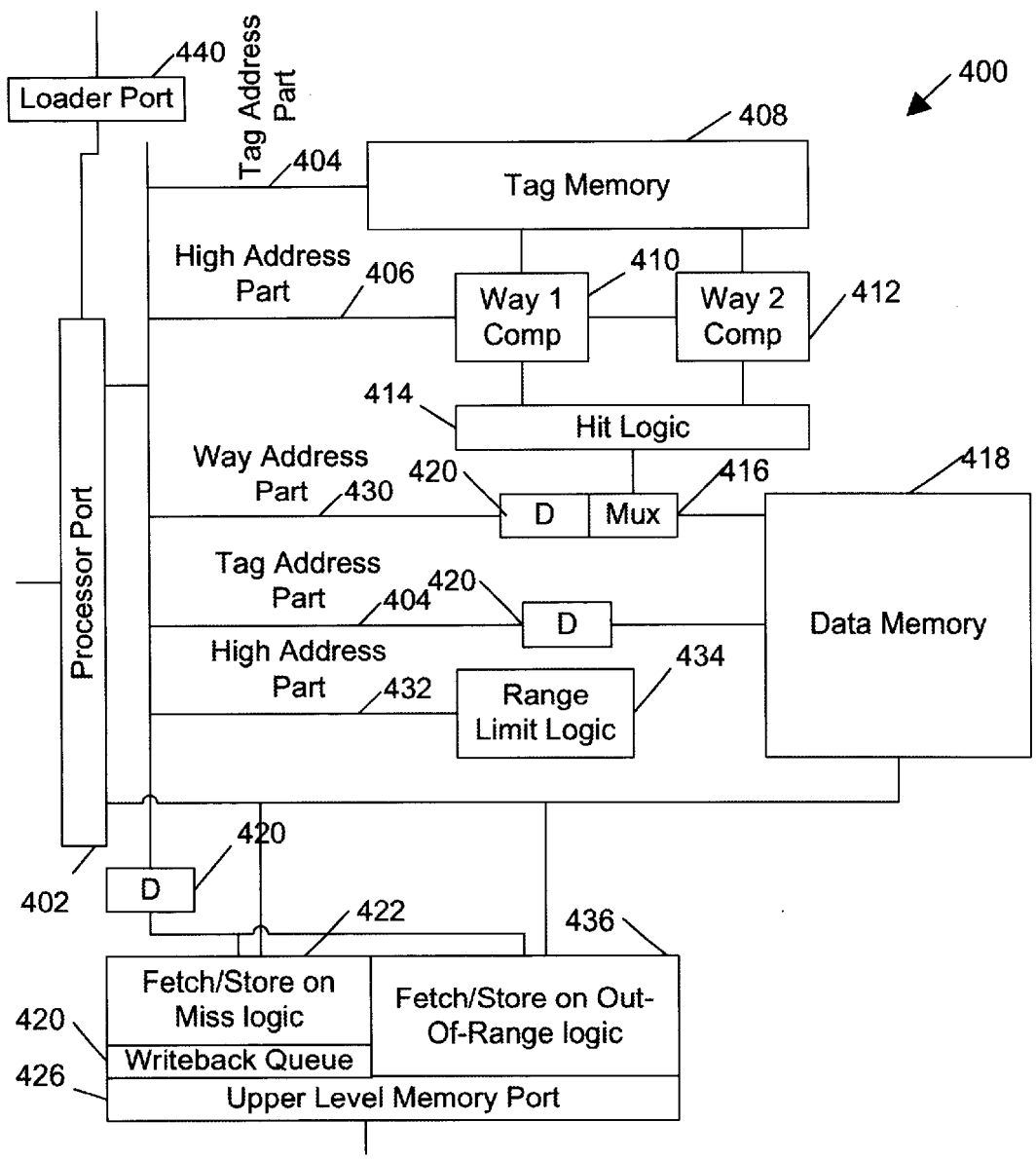
FIG. 4, a block diagram of a memory configurable to serve as a cache memory or as local memory of a system device.
Figure 5:
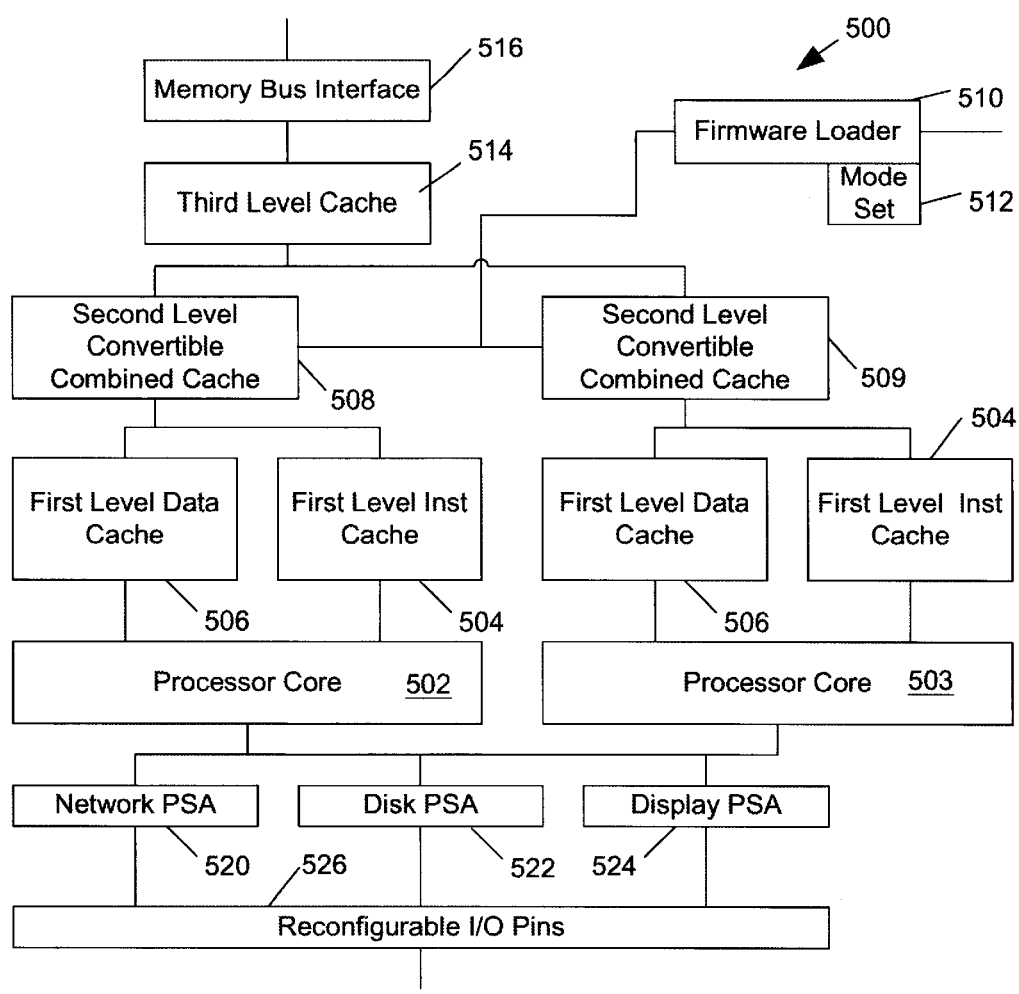
FIG. 5, a block diagram of an alternative embodiment embodying second level convertible cache.

A convertible cache 400 (FIG. 4) according to the invention, usable as convertible data cache 306 and as convertible instruction cache 304, receives processor memory references through a processor port 402. The convertible cache has two modes, a cache mode and a local memory mode.

When a particular processor 302 of the integrated circuit is used as an intelligent peripheral device, the associated convertible data cache 304 and convertible instruction cache 306 are operated in local memory mode. Further, when the convertible instruction cache 306 is operated in local memory mode it is loaded with firmware appropriate for a particular intelligent peripheral that may use one or more of the PSA's 312, 314, and 316 provided on the integrated circuit, and suitable pins of reconfigurable I/O pins 318 are coupled to each PSA that is being used. When the particular processor 302 of the integrated circuit is used as a general purpose processing resource, the associated convertible data cache 304 and convertible instruction cache 306 are operated in cache mode. Mode selection is under control of mode setting logic 320. A firmware loader 322 is provided such that each convertible instruction cache 306 may be written under control of another processor or with code read from an external serial EEPROM.

In cache mode, addresses for these memory references are broken down into a tag address part 404 (FIG. 4) and a high address part 406. The tag address part 404 is used to address a line of tag memory 408. Each line of tag memory has several address tags and flags as required for cache management. The address tags of the addressed line of tag memory 408 is compared with the high address part 406 in way-specific comparators 410, 412. While two way-specific comparators 410, 412, are illustrated, the invention contemplates additional way-specific comparators. The comparator results are used by hit logic 414 to determine if a memory reference has scored a hit in the cache.

Figure 3:
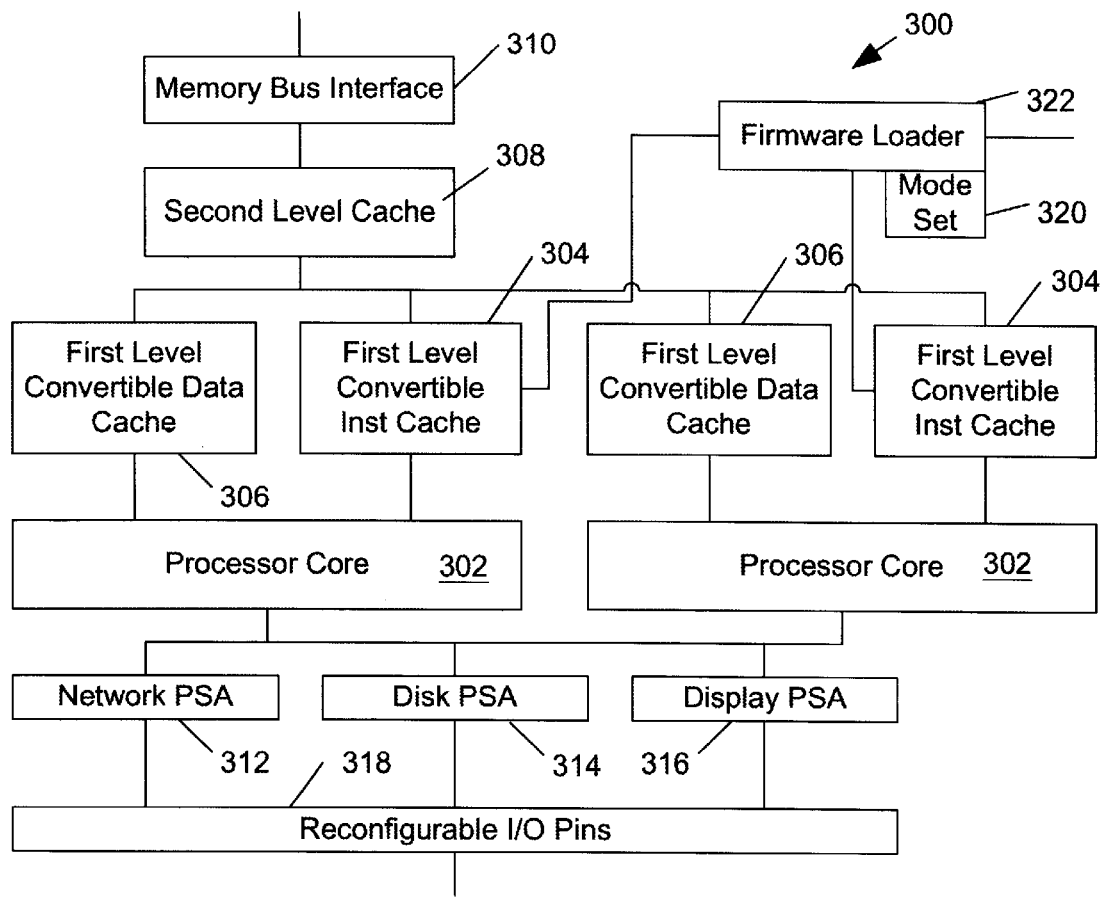
FIG. 3, a block diagram of an integrated circuit embodying first level convertible cache and peripheral specific apparatus.

An identity of the way-specific comparator scoring a hit is passed by a multiplexer 416, together with the tag address part 404, to address a data memory 418. Address portions may be delayed by pipeline latches 420 as necessary to allow for delays in the tag memory and other logic. Read references found in the cache are the read from data memory 418 through the processor port 402 to the attached processor core, such as processor core 302 (FIG. 3). Write references that hit in the cache are entered into a writeback queue 422 of fetch/store-on-miss logic 424 for writing through an upper level memory port 426 for updating higher level memory.

In local memory mode, the processor memory references are received through processor port 402. Addresses for these references are broken into a way address part 430, a tag address part 404, and a high address part 432. The tag address part 404, together with the way address part 430, is used to address the data memory, while the high address part 432 is checked by range limit logic 434 to determine if the address is in local memory, or is at an address out-of-range in local memory and therefore located in higher-level memory. Local memory read and write operations are then performed to the selected line of data memory 418, while out-of-range operations are performed to higher level memory by fetch/store on out of range logic 436 through upper level memory port 426.

Convertible cache memories used as instruction cache 306 or as a combined instruction/data cache have a firmware loader port 440, that permits write access by a firmware loader 322. This write access is achieved by effectively substituting the firmware loader 322 for the processor 302 associated with the convertible cache.

In a particular embodiment, the convertible cache memory also has a block transfer engine capable of transferring determinable blocks of data between higher level memory and the cache data memory. This block transfer engine is used to transfer data blocks that may correspond to network packets or disk sectors.

The invention contemplates multiple processor integrated circuits having various combinations of peripheral-specific apparatus. In particular, the invention contemplates embodiments having PSA 312, 314, 316, suitable for one or more of 100-BaseT networks, Gigabit networks, serial ports including USB, Firewire, and Infiniband, disk interfaces including SCSI, Fibre-Channel, and IDE disk interfaces, SVGA graphics accelerators, and DDR-DRAM and SDRAM memory controllers In an alternative embodiment, convertible cache memories 304, 306, processors 302, and second level cache 308 are all built with standard-cell and full-custom methodology as known in the art of integrated circuit design. A block of Field Programmable Gate Array (FPGA) cells is provided that is configurable into PSA's under control of the firmware loader 322.

In a second alternative embodiment of the integrated circuit 500, the integrated circuit has several processors 502, 503, each having first level data cache 504 and instruction cache 506. Each processor has an associated convertible second level cache 508, 509 that is loadable under control of a firmware loader 510, and setable to local memory or cache modes, as previously described with reference to FIG. 4, under control of mode set logic 512. There is also a third-level cache 514 coupled to pass cache miss operations through a memory bus interface 516 to higher level cache or main memory (not shown) of a computer system using the integrated circuit.

Each processor of the second alternative embodiment can address peripheral specific apparatus, such as a network PSA 520, a disk controller PSA 522, and a display PSA 524. The PSAs communicate with external devices through a group of reconfigurable I/O pins 526. The invention contemplates that a parallel-port PSA may be also be provided, such that I/O pins of the reconfigurable I/O pins 526 may be used as parallel-port input-output pins.

At system boot time, the mode set logic 512 may be set such that each processor 502, 503 is available as a general purpose processor, or may be set such that one or more particular processors 503 is dedicated to perform as an intelligent peripheral. Dedicating a processor 503 to perform as an intelligent peripheral includes configuring the associated convertible cache 509 in memory mode. In the event that a processor 503 is set as an intelligent peripheral, firmware loader 510 is used to load suitable firmware code into at least part of the associated convertible cache 509. Any remaining space in convertible cache 509 after the firmware is loaded may be used for data.

Figure 6:
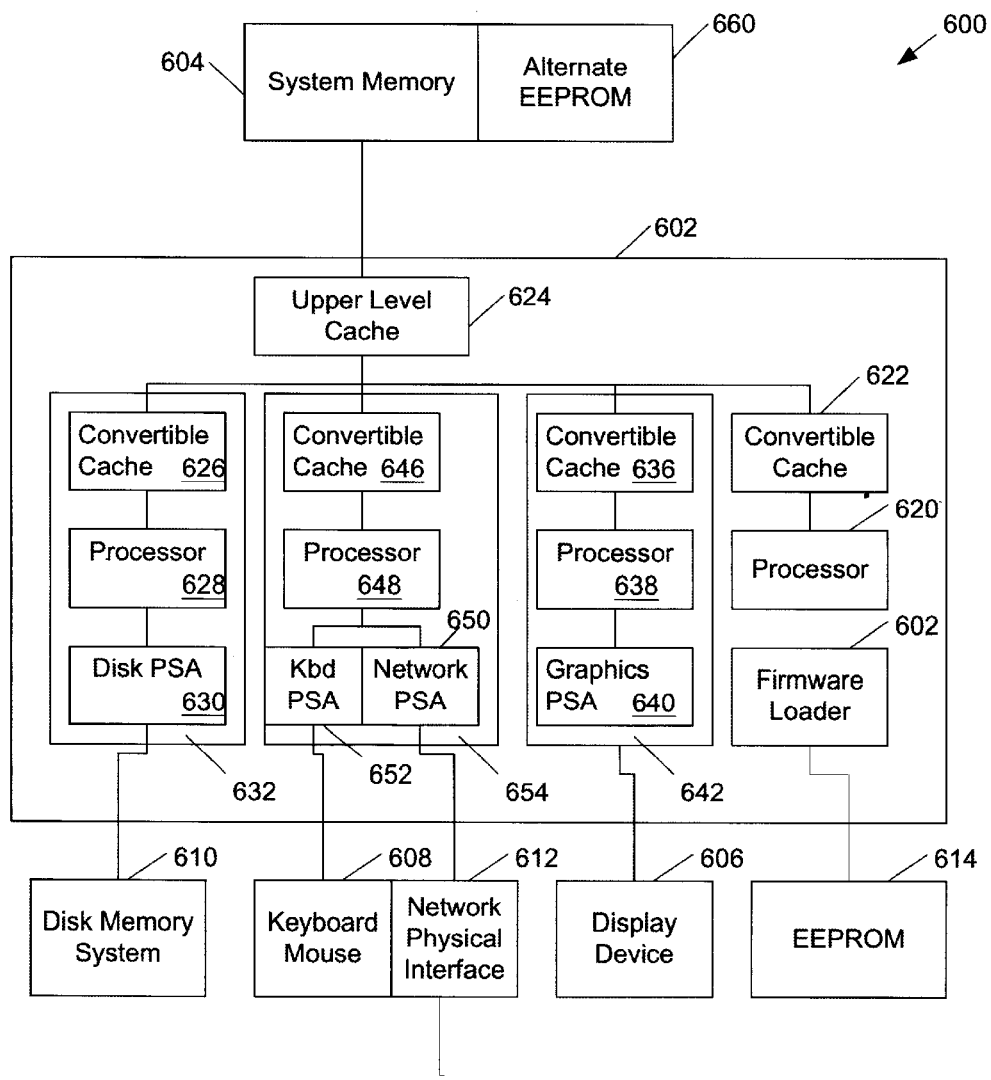
FIG. 6, a block diagram of a system incorporating the present multiple-processor integrated circuit, and providing an EEPROM for firmware.

A system 600 (FIG. 6) embodying the present multiple processor integrated circuit 602 has system memory 604, a display device 606, a keyboard and mouse 608, a disk memory system 610, and a network physical layer interface 612. There is also a firmware EEPROM 614.

Network physical layer interface 612 contains protective devices for preventing the multiple processor integrated circuit 602 from being destroyed by voltage surges that may be encountered on network circuitry. Network physical layer interface 612 also contains level shifting devices for adapting low-voltage signaling of the multiple processor integrated circuit 602 to the higher voltage and higher power signal levels typical of networks.

A first processor 620 operates as a system processor, and its associated convertible cache 622 operates as a cache memory. References that miss in convertible cache 622 are passed to a higher level cache 624, and references that miss there are passed on to system memory 604.

A second convertible cache 626 is configured as a memory, operating as memory associated with a second processor 628. Once the system has initialized and firmware code has been transferred from firmware EEPROM 614 into the second convertible cache 626, second processor 628 operates with a disk interface PSA 630 as an intelligent disk controller 632, which controls disk memory 610.

A third convertible cache 636 is also configured as a memory, operating as memory associated with a third processor 638. Processor 638 is coupled to a graphics PSA 640. Once the system has initialized and firmware code has been transferred from firmware EEPROM 614 into third convertible cache 636, third processor 638, third convertible cache 636, and graphics PSA 640 operate as an intelligent graphics accelerator and graphics interface 642.

Similarly, fourth convertible cache 646 is configured as a memory associated with fourth processor 648. Fourth processor 648 is coupled to a network PSA 650 and a keyboard/mouse interface PSA 652. Once the system has initialized and firmware code has been transferred from firmware EEPROM 614 into fourth convertible cache 646, third processor 648, fourth convertible cache 646, network PSA 650, and keyboard/mouse interface PSA 652 operate as an intelligent network adapter and keyboard/mouse interface 654.

In an alternative embodiment of the system, firmware EEPROM 660 is accessed over a memory bus in similar manner to the system memory 604.

While the invention has been particularly shown and described with reference to a preferred embodiment thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. An integrated circuit comprising:
    a plurality of processors;
    a first, second, third, and fourth convertible cache capable of operating in a mode selected from the group of modes consisting of local memory mode and cache mode;
    a first processor coupled to receive instructions from the first convertible cache and data from the second convertible cache;
    a second processor coupled to receive instructions from the third convertible cache and data from the fourth convertible cache;

a fifth cache operable as a second level cache, the fifth cache coupled to the first, second, third, and fourth caches and capable of being coupled to a main memory external to the integrated circuit;

a block transfer engine capable of transferring blocks of data between the second convertible cache and the main memory when the second convertible cache is operated in local memory mode;

a peripheral specific apparatus for interfacing the first processor to an external peripheral device;

wherein the first and second processor are capable of operating as general purpose processors; and wherein the first processor is capable of operating as a general purpose processor when the convertible cache is operated in the cache mode, and the first processor is capable of operating as a processor of an intelligent peripheral when the convertible cache is operated in the local memory mode.

2. The integrated circuit of claim 1 further comprising a firmware loader for copying firmware from a programmable read only memory into a convertible cache operated in memory mode.

3. The integrated circuit of claim 2 wherein the peripheral specific apparatus comprises apparatus for interfacing the first processor to at least one disk interface compliant with a standard selected from the group consisting of SCSI, and IDE disk interface standards.

4. The integrated circuit of claim 3 wherein the peripheral specific apparatus comprises apparatus for serializing and deserializing data coupled to the first processor and capable of operating with the first processor as an intelligent peripheral adapter for use with peripheral devices selected from the group consisting of fiber channel disk drives, 100-BaseT networks, Gigabit networks, USB, Firewire, and Infiniband devices.

5. The integrated circuit of claim 2, wherein the peripheral-specific apparatus includes a plurality of field-programmable gate-array (FPGA) cells capable of being configured for use as peripheral-specific apparatus for at least one intelligent peripheral.

* * * * *